US012644316B2

(12) United States Patent
Brown

(10) Patent No.: US 12,644,316 B2
(45) Date of Patent: Jun. 2, 2026

(54) FRICTION-ATTACHED CHILDPROOF LATCH FOR CABINETS AND DRAWERS

(71) Applicant: Daniel Brown, Newton, MA (US)

(72) Inventor: Daniel Brown, Newton, MA (US)

( * ) Notice: Subject to any disclaimer, the term of this patent is extended or adjusted under 35 U.S.C. 154(b) by 2 days.

(21) Appl. No.: 18/787,434

(22) Filed: Jul. 29, 2024

(65) Prior Publication Data

US 2026/0028857 A1    Jan. 29, 2026

Related U.S. Application Data

(60) Provisional application No. 63/632,488, filed on Apr. 10, 2024.

(51) Int. Cl.
*E05B 65/00* (2006.01)
*E05B 65/46* (2017.01)

(52) U.S. Cl.
CPC .......... *E05B 65/0014* (2013.01); *E05B 65/46* (2013.01)

(58) Field of Classification Search
CPC .............................. E05B 65/0014; E05B 65/46
See application file for complete search history.

(56) References Cited

U.S. PATENT DOCUMENTS 3,397,001 A * 8/1968 Friedman ............ E05B 65/0014 292/87
3,674,299 A 7/1972 Kelley
3,834,746 A 9/1974 Hinden
3,938,839 A * 2/1976 Collier ................ E05B 65/0894 292/288
4,585,259 A * 4/1986 Vidas ...................... E05C 17/54 292/339
5,445,451 A * 8/1995 Harmony ............... A47B 88/57 312/333
5,556,141 A * 9/1996 Rogers .................... E05C 19/06 292/99
6,431,616 B1 8/2002 Julian
6,481,811 B1 11/2002 Marsh
6,604,764 B2 * 8/2003 Zemzik ................. E05C 19/188 292/288

(Continued)

FOREIGN PATENT DOCUMENTS

CN 105507685 4/2016
GB 2539950 9/1927
GB 2553270 3/2018

*Primary Examiner* — Kristina R Fulton
*Assistant Examiner* — Thomas L Neubauer
(74) *Attorney, Agent, or Firm* — Lambert Shortell & Connaughton; David J. Connaughton, Jr.; Justin P. Tinger

(57) ABSTRACT

The present disclosure teaches a friction-attached childproof latch for cabinets and drawers. Wherein, each half of the childproof latch includes a C-shaped frame with one top surface and two side surfaces, and a jaw is placed between the side surfaces, and connected to one of the side surfaces via a screw. The jaw may move with regard to the frame along the screw by tightening or loosening the screw. A panel of a cabinet or drawer may be friction-attached between the jaw and an opposite side surface of the frame. A first connector may be placed onto any surface of the frame, or connected to the frame via an extension piece. Wherein, the first connector may removably connect to a second connector placed on the other half of the latch. These connectors may take various forms, such as a hook and staple, a tether connection, or a snap fastener.

20 Claims, 7 Drawing Sheets

(56) References Cited

U.S. PATENT DOCUMENTS

| | | | | |
|---|---|---|---|---|
| 7,385,521 | B2 | 6/2008 | Macari | |
| 8,596,729 | B2 | 12/2013 | Sabelli | |
| 9,593,509 | B2 | 3/2017 | Murray | |
| 9,856,682 | B1 * | 1/2018 | Cook | E05C 19/18 |
| 11,434,665 | B2 | 9/2022 | Andersen | |
| 11,680,425 | B2 | 6/2023 | Marsden | |
| 11,712,112 | B2 * | 8/2023 | Wang | A47B 88/50 312/333 |
| 2003/0034656 | A1 * | 2/2003 | Zemzik | E05C 19/188 292/293 |
| 2003/0048050 | A1 * | 3/2003 | Wong | E05B 65/0014 312/333 |
| 2009/0109575 | A1 | 4/2009 | Mccoy-Deedler | |
| 2011/0175374 | A1 * | 7/2011 | Hertrich | E05B 65/0014 292/195 |
| 2018/0023323 | A1 * | 1/2018 | Anderson | E05B 65/46 292/80 |
| 2022/0042360 | A1 | 2/2022 | Andersen | |
| 2022/0170299 | A1 | 6/2022 | Andersen | |

* cited by examiner

FRICTION-ATTACHED CHILDPROOF LATCH FOR CABINETS AND DRAWERS

TECHNICAL FIELD

The present disclosure relates to the technical field of child safety devices and furniture hardware.

BACKGROUND

Childproof latches can prevent young children or pets from getting into cabinets and drawers that may contain potentially harmful or hazardous items (sharp tools, cleaning supplies with toxic chemicals, moldy pipes, etc.). State-of-the-art childproof latches may be attached to surfaces of cabinets, drawers, or doors using two methods: one involves using adhesive pads and the other involves using drilling and screws to attach latch mechanisms to surfaces. However, neither method is ideal. Adhesive pads tend not to be long-lasting, cannot be reused, typically require 24 hours of cure time, only work well with surfaces with certain textures, and may be hard to remove. Drilling and screws, on the other hand, may permanently damage the surfaces of cabinets, drawers, or doors, and require a certain skill level to operate. Hence, a friction-attached childproof latch may solve these issues. Moreover, a friction-attached childproof latch can have greater portability than childproof latches using adhesive pads and drilling/screws, since they contain fewer pieces and gadgets.

Another common issue with childproof latches is that there may be no way to properly line two pieces in a latch up for certain drawer or cabinet configurations. Hence, an additional distance/height adjustment mechanism may be introduced to solve this problem.

SUMMARY

The presently disclosed technology teaches a friction-attached childproof latch, comprising: a first half, including: a first frame with one first top surface and two first side surfaces forming a first "C" shape; a first jaw placed between the two first side surfaces, and connected to one of the first side surfaces via a first screw; wherein, the first jaw is able to move along the first screw, by loosening or tightening the first screw; a first connector connected to the first frame; a second half, including: a second frame with one second top surface and two second side surfaces forming a second "C" shape; a second jaw placed between the two second side surfaces, and connected to one of the second side surfaces via a second screw; wherein, the second jaw is able to move along the second screw, by loosening or tightening the second screw; a second connector connected to the second frame; wherein, the first connector may be removably connected to the second connector.

In some embodiments, a first panel of a drawer or cabinet is removably friction-attached between the first jaw and the first frame, and a second panel of the drawer or cabinet is removably friction-attached between the second jaw and the second frame.

In some embodiments, the first connector is connected to the first frame via a first extension piece.

In some embodiments, the first connector is an elongated shank with a hook and the second connector is a staple, and the first connector and the second connector can be connected or separated by attaching the hook to the staple or detaching the hook from the staple.

In some embodiments, the first connector includes a first base on the first frame and a tether connected to the first base, the second connector includes a second base; wherein the tether can be removably connected to the second base.

In some embodiments, the first connector includes a ribbon with one end attached to the first frame and the other end attached to a stud, and the second connector includes a socket attached to the second frame; wherein the first connector and the second connector can be connected or separated by snapping the stud onto the socket or detaching the stud from the socket.

In some embodiments, the first frame further includes one or more rails and a slide able to move along the one or more rails; the first connector is connected to the slide via one or more third screws; and when the one or more third screws are tightened, the slide is able to be secured to the one or more rails and no longer able to move with regard to the one or more rails.

In some embodiments, the one first top surface and the two first side surfaces are all rectangular and flat.

In some embodiments, the two first side surfaces are identical.

The presently disclosed technology also includes a half of a friction-attached childproof latch, comprising: a frame with one top surface and two side surfaces forming a "C" shape; a jaw placed between the two side surfaces, and connected to one of the side surfaces via a first screw; wherein, the jaw is able to move along the first screw, by loosening or tightening the first screw; a connector connected to the frame able to be removably connected to a second connector of a second half of the friction-attached childproof latch.

In some embodiments, a panel of a drawer or cabinet is removably friction-attached between the jaw and the frame.

In some embodiments, the connector is connected to the frame via an extension piece.

In some embodiments, the connector is an elongated shank with a hook.

In some embodiments, the connector is a staple.

In some embodiments, the connector includes a first base on the first frame and a tether connected to the first base.

In some embodiments, the connector includes a second base able to be removably connected to a tether.

In some embodiments, the connector includes a ribbon with one end attached to the first frame and the other end attached to a stud, able to be snapped onto and detached from a socket.

In some embodiments, the connector includes a socket able to be removably connected to a stud.

In some embodiments, the frame further includes one or more rails and a slide able to move along the one or more rails; the connector is connected to the slide via one or more third screws; and when the one or more third screws are tightened, the slide is secured to the one or more rails and no longer able to move with regard to the one or more rails.

In some embodiments, the one top surface and the two side surfaces are all rectangular and flat, and form a rectangular cuboid.

BRIEF DESCRIPTION OF THE DRAWINGS

The present disclosure is further illustrated by way of exemplary embodiments, which are described in detail through the accompanying drawings. These embodiments are not limiting, and in these embodiments, the same numbering indicates the same structure, wherein.

DETAILED DESCRIPTION

Figure 1:
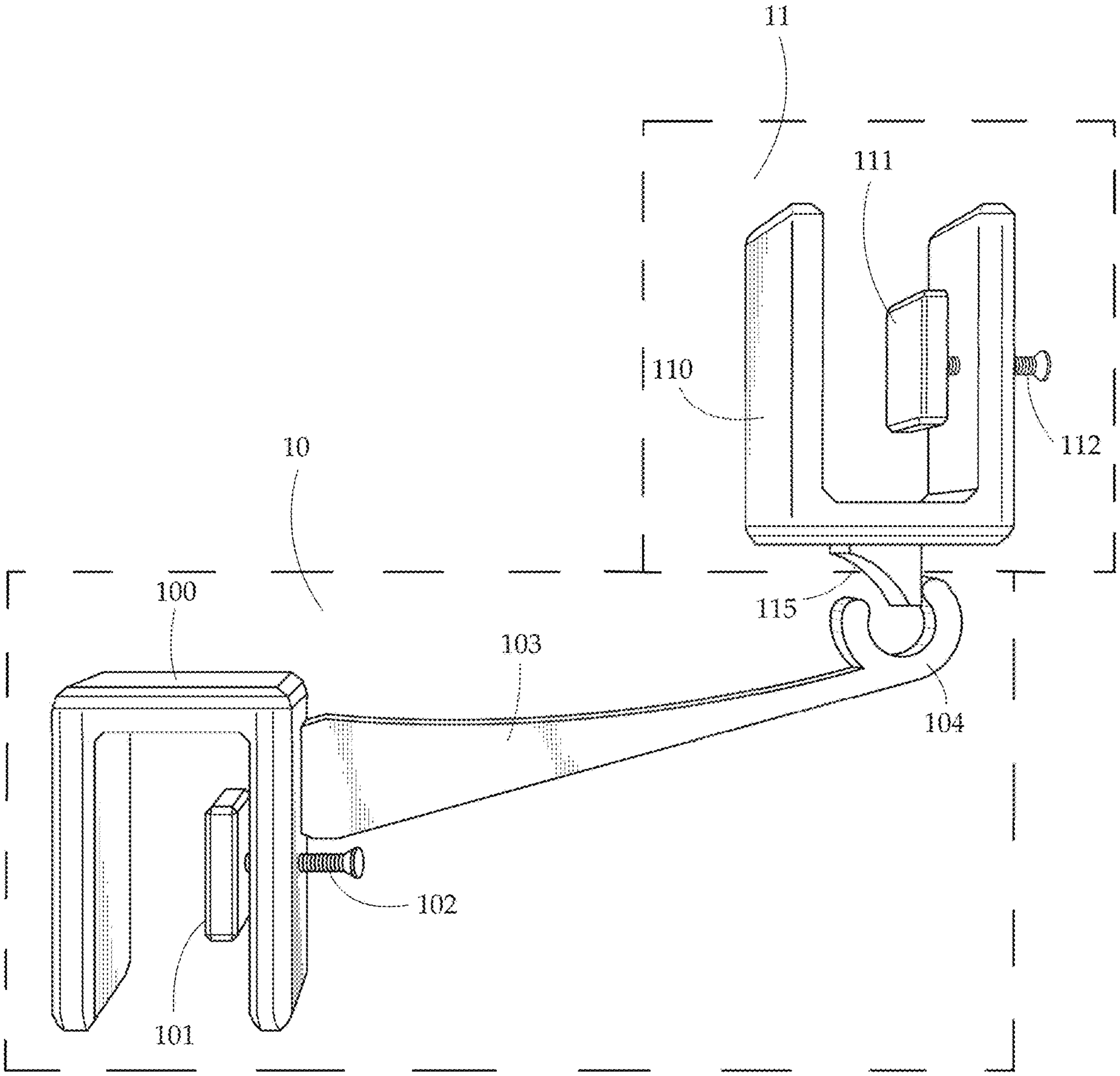
FIG. 1 is a structural diagram showing a friction-attached childproof latch for cabinets and drawers, according to a first exemplary embodiment of the present disclosure.

In order to more clearly illustrate the technical solutions of the embodiments of the present disclosure, the accompanying drawings for the description of the embodiments are described below. Obviously, the accompanying drawings in the following description are only some examples or embodiments of the present disclosure, and it is possible for a person of ordinary skill in the art to apply the present disclosure to other similar scenarios in accordance with these accompanying drawings without creative labor. Unless obviously obtained from the context or the context illustrates otherwise, the same numeral in the drawings refers to the same structure or operation.

It should be understood that the terms "system," "device," "unit," and/or "module" are used herein as a way to distinguish between different components, elements, parts, sections, or assemblies at different levels. However, if other words may achieve the same purpose, the terms may be replaced with alternative expressions.

As indicated in the present disclosure and in the claims, unless the context clearly suggests an exception, the words "one," "a," "a kind of," and/or "the" do not refer specifically to the singular but may also include the plural. In general, the terms "include" and "comprise" suggest only the inclusion of clearly identified steps and elements, which do not constitute an exclusive list, and the method or device may also include other steps or elements.

FIG. 1 is a structural diagram showing a friction-attached childproof latch for cabinets and drawers, according to a first exemplary embodiment of the present disclosure.

As shown in FIG. 1, in some embodiments, the presently disclosed childproof latch may have a first half 10 and a second half 11. Each half may be attached to a panel in a cabinet, drawer, or other pieces of furniture via a friction attachment mechanism. Each half may also include a connector that may be attached to or detached from the connector on the other half. As will be discussed in detail below, the connectors may be a hook-and-staple assembly, a tether connector, a snap fastener, or other structures serving similar purposes. In some embodiments, the friction attachment mechanism may be implemented as a clamp including a first frame 100, a first jaw 101, and a first screw 102. In some embodiments, the first frame 100 may include three surfaces of a rectangular cuboid forming a "C" shape. Wherein, the three surfaces may include two side surfaces and a top surface. Alternatively, the first frame 100 may be of other configurations that form a "C" shape. For example, the top surface of the "C" shape may be curved instead of flat. For another example, the side surfaces may be of non-rectangular shapes, or have different sizes. Alternatively, in some embodiments, other clamp configurations, such as an F-clamp or a bar clamp, may be used instead of the C-shaped clamp formed by the first frame 100, the first jaw 101, and the first screw 102. One of the side surfaces may be in direct contact with one side of a first panel when in use. A first screw 102 may be attached to the other side surface, connecting a first jaw 101. In some embodiments, a body of the first screw 102 may be perpendicular to the side surfaces. In some embodiments, a ratcheting structure or other similar structures that allow motion in one direction but prevent it from backing out unintentionally may be implemented in conjunction with the first screw 102. Wherein, in some embodiments, the first jaw 101 may be implemented as a flat, rectangular piece smaller than that of the side surfaces in the first frame 100. Alternatively, the first jaw 101 may have other shapes. In some embodiments, the first jaw 101 may be placed between the two side surfaces of the first frame 100. In some embodiments, the first jaw 101 may move along the first screw 102 with regard to the first frame 100, by a user loosening or tightening the first screw 102. In some embodiments, when the presently disclosed invention is in use, the first panel may be placed between the first jaw 101 and the side surface opposite the first jaw of the first frame 100. In some embodiments, the user may loosen the first screw 102 when they need to detach the clamp from the first panel and tighten the first screw 102 when they need to secure the clamp to the first panel. In some embodiments, both the first frame 100 and the first jaw 101 may have a texture that offers sufficient friction between the first frame 100, the first jaw 101, and the first panel, so that the clamp may be properly secured to the first panel when the first screw 102 is tightened. For example, the first frame 100 and/or the first jaw 101 may have teeth or other similar textures. For another example, the first frame 100 and/or the first jaw 101 may be made of or include a layer of high-friction material on their (its) surface(s), such as a rubberized or polymer material. Alternatively, the first frame 100 and/or the first jaw 101 may include a layer of foam-like material on their surfaces to form (a) flexible connection surface(s).

Alternatively, in some embodiments, one or more springs may be used to connect the first jaw 101 and one side surface of the first frame 100 instead of the first screw 102. When the springs are compressed, the distance between the first jaw 101 and the opposite side surface of the first frame 100 may be slightly enlarged, enabling the user to detach the mounting hardware from the first panel. When the springs are relaxed, the distance between the first jaw 101 and the other side surface of the first frame 100 may be slightly shortened, thus securing the mounting hardware to the first panel by friction.

Alternatively, in some embodiments, the top surface of the first frame 100 may include a bar or a slot perpendicular to the side surfaces of the first frame, and the first jaw 101 may be able to slide along the bar or slot. In some embodiments, the top surface of the first frame 100 itself may be replaced by a bar or a slot. In some embodiments, only the side surface of the first frame 100 opposite to the first jaw 101 may be included in the first frame. A screw connecting the top surface and the first jaw 101 may be tightened to secure the first jaw in place and loosened to release the first jaw.

In some embodiments, an elongated shank 103 may be attached to one of the surfaces of the first frame 100. In the exemplary embodiment as shown in FIG. 1, the shank 103 is attached to the side surface to which the first screw 102 is attached. In other embodiments, the shank 103 may also be attached to the other side surface or the top surface of the first frame. The other side of the shank 103 may connect to a hook 104. In some embodiments, the shank 103 and the hook 104 may be manufactured as one consolidated piece. In some embodiments, both the shank 103 and the hook 104 may be rigid.

In some embodiments, a second mounting mechanism comprising a second frame 110, a second jaw 111, and a second screw 112 may be secured to a second panel, which, along with a staple 115 attached to one surface of the second frame 110, forms the other piece of the latch. In the exemplary embodiment as shown in FIG. 1, the staple 115 is attached to the top surface of the second frame 110. In other embodiments, the staple 115 may be attached to one of the side surfaces of the second frame 110.

In some embodiments, the hook 104 may be hooked onto or unhooked from the staple 115. Hence, when the user wants to open the drawer or cabinet door, they may unhook the hook 104 from the staple 115, thus separating the two pieces of the latch. When the user wants to secure the drawer or cabinet door, they may hook the hook 104 onto the staple 115, thus connecting the two pieces of the latch. The hook 104 cannot be easily unhooked by a young child or a pet, thus serving its safety purposes.

The presently disclosed childproof latch may have a variety of embodiments for different drawer/cabinet configurations. For example, the first panel and the second panel may be aligned, may be parallel to each other but not aligned, may be perpendicular to each other, may have different distances between them, etc. Different features and embodiments of the presently disclosed childproof latch will be discussed in the following paragraphs.

Figure 2:
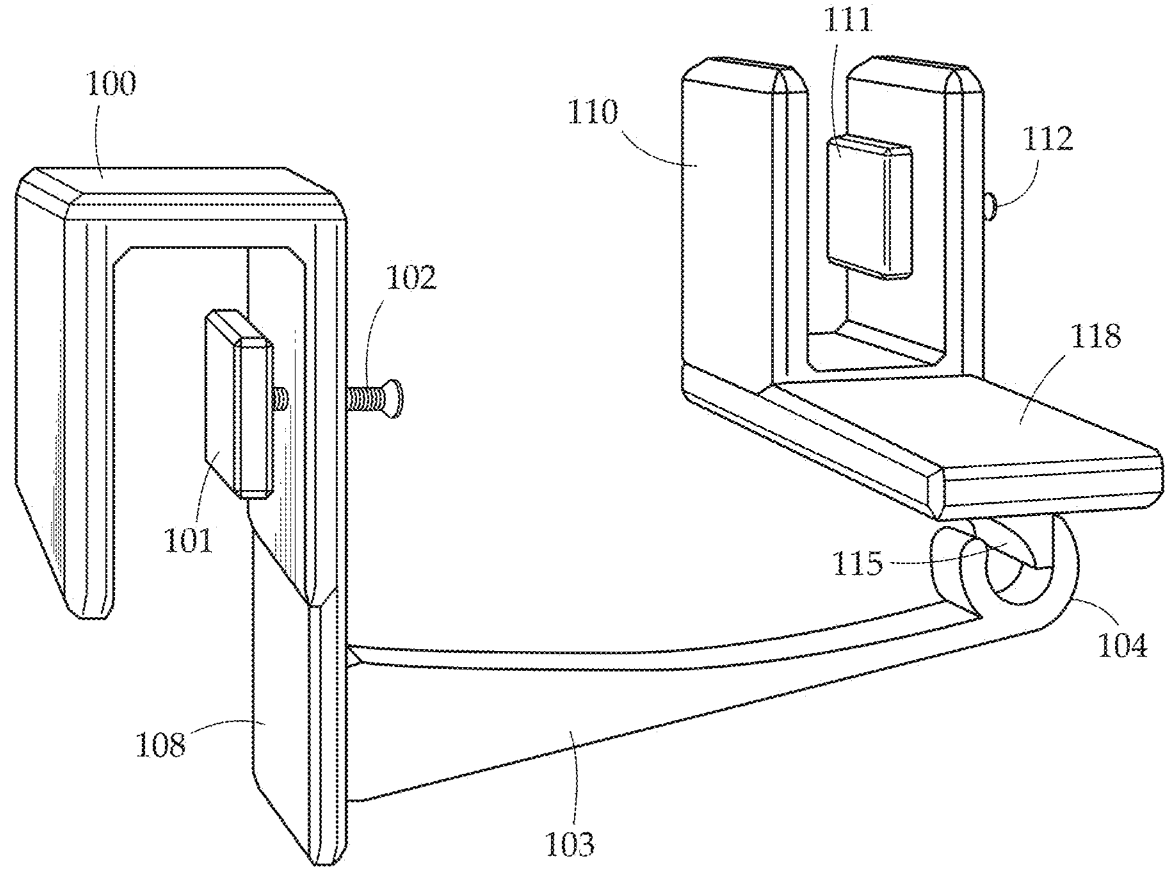
FIG. 2 is a structural diagram showing the friction-attached childproof latch for cabinets and drawers, according to a second exemplary embodiment of the present disclosure.

FIG. 2 is a structural diagram showing a friction-attached childproof latch for cabinets and drawers, according to a second exemplary embodiment of the present disclosure.

As shown in FIG. 2, in some embodiments, extension pieces 108/118 may be attached to one of the surfaces of the frames 100/110, and the shank 103 or the staple 115 may be attached to the extension pieces. This addition of extension pieces 108/118 could help shorten or enlarge the distance between the shank 103 and the staple 115 so that the hook 104 and the staple could match for cabinets and drawers with different configurations. In some embodiments, the extension pieces 108/118 may be flat and rectangular, extending from and aligning with a top surface or a side surface of the frames 100/110. In some embodiments, the extension pieces may have other shapes and sizes, and may not perfectly align with the surfaces of the frames. In some embodiments, the extension pieces may be removably connected to the frames, so that a user could customize the configuration of the presently disclosed childproof latch according to the specific configuration of the cabinets or drawers the latch will be used on. In other embodiments, the extension pieces may be able to slide along a rail with regard to the frames, so that the distance between the shank 103 and the staple 115 may be adjusted.

Figure 3:
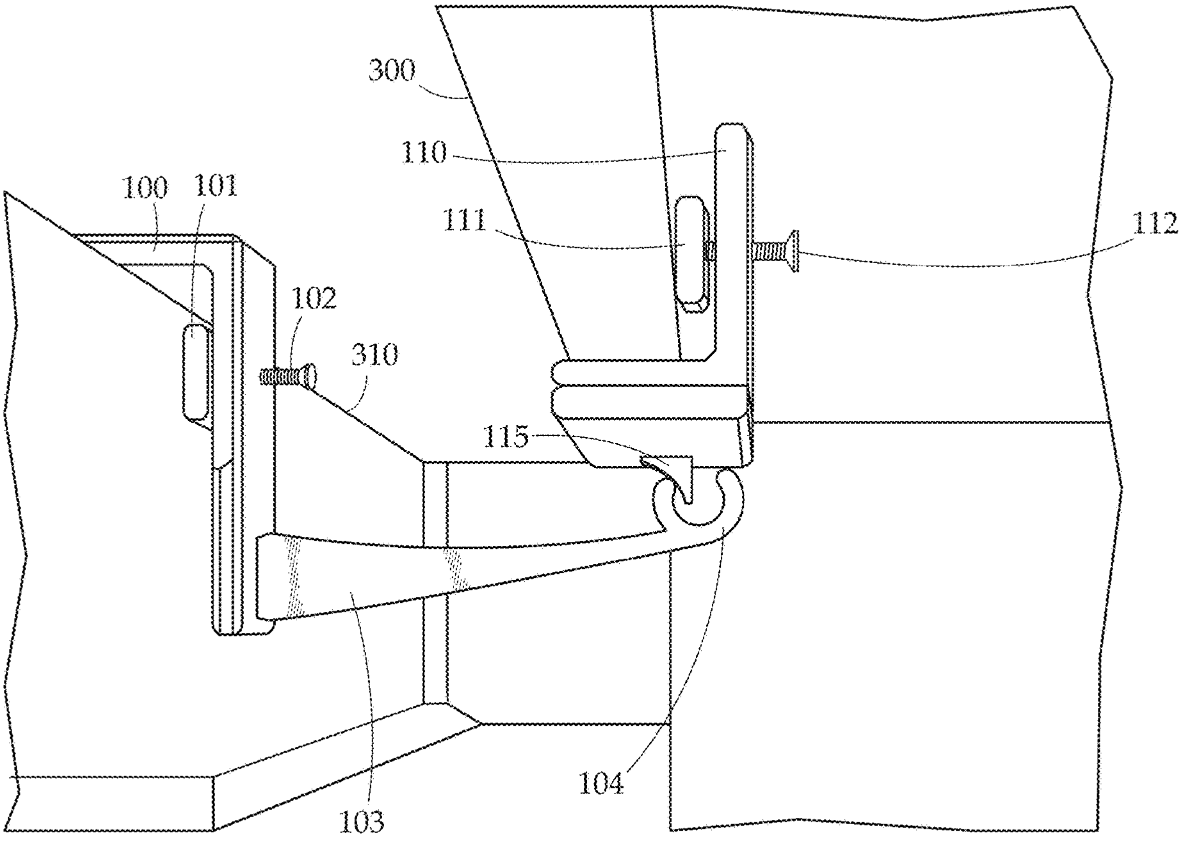
FIG. 3 is a diagram showing the friction-attached childproof latch for cabinets and drawers in use, according to the first and second exemplary embodiments of the present disclosure.

FIG. 3 is a diagram showing the friction-attached childproof latch for cabinets and drawers in use, according to the first and second exemplary embodiments of the present disclosure.

As shown in FIG. 3, a first half of the childproof latch may be attached to a first panel 300, and a second half of the childproof latch may be attached to a second panel 310. For example, the first panel 300 may be a lower lip of a front panel of an upper drawer, and the second panel 310 may be an upper lip of a front panel of a lower drawer. The first half and the second half of the childproof latch may connect via a hook/staple mechanism as discussed above. As shown in FIG. 3, for a typical drawer with an upward opening, the shank/hook structure may be attached to an inner side surface of the frame of the second half of the childproof latch and placed inside the lower drawer, and the staple may be placed on an lower surface of the frame of the first half of the childproof latch and on a bottom edge of the front panel of the upper drawer. When the hook is hooked onto the staple, the childproof latch may hold the drawer closed (or semi-closed) until a user detaches the hook from the staple.

Figure 4:
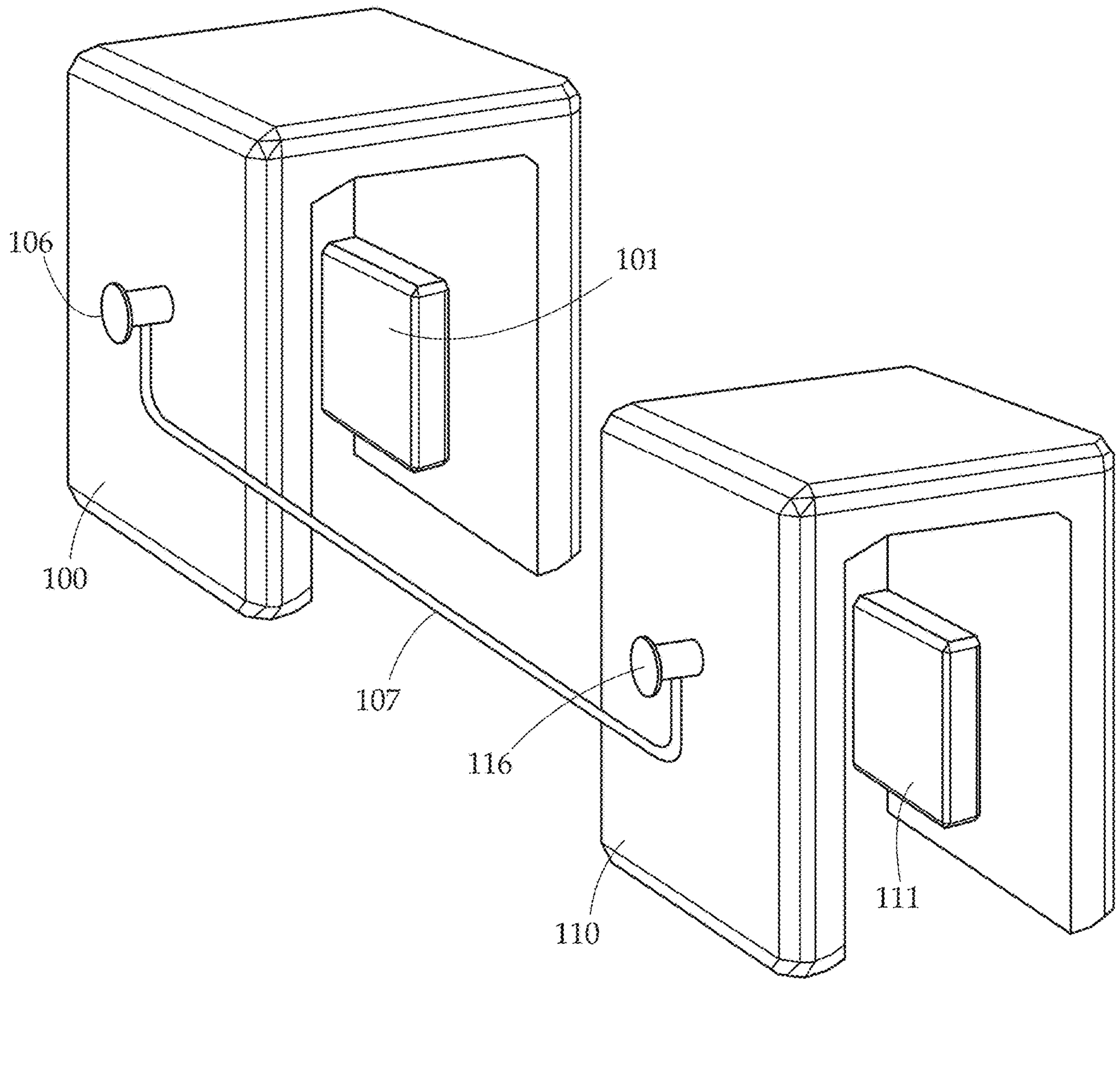
FIG. 4 is a structural diagram showing the friction-attached childproof latch for cabinets and drawers, according to a third exemplary embodiment of the present disclosure.
Figure 5:
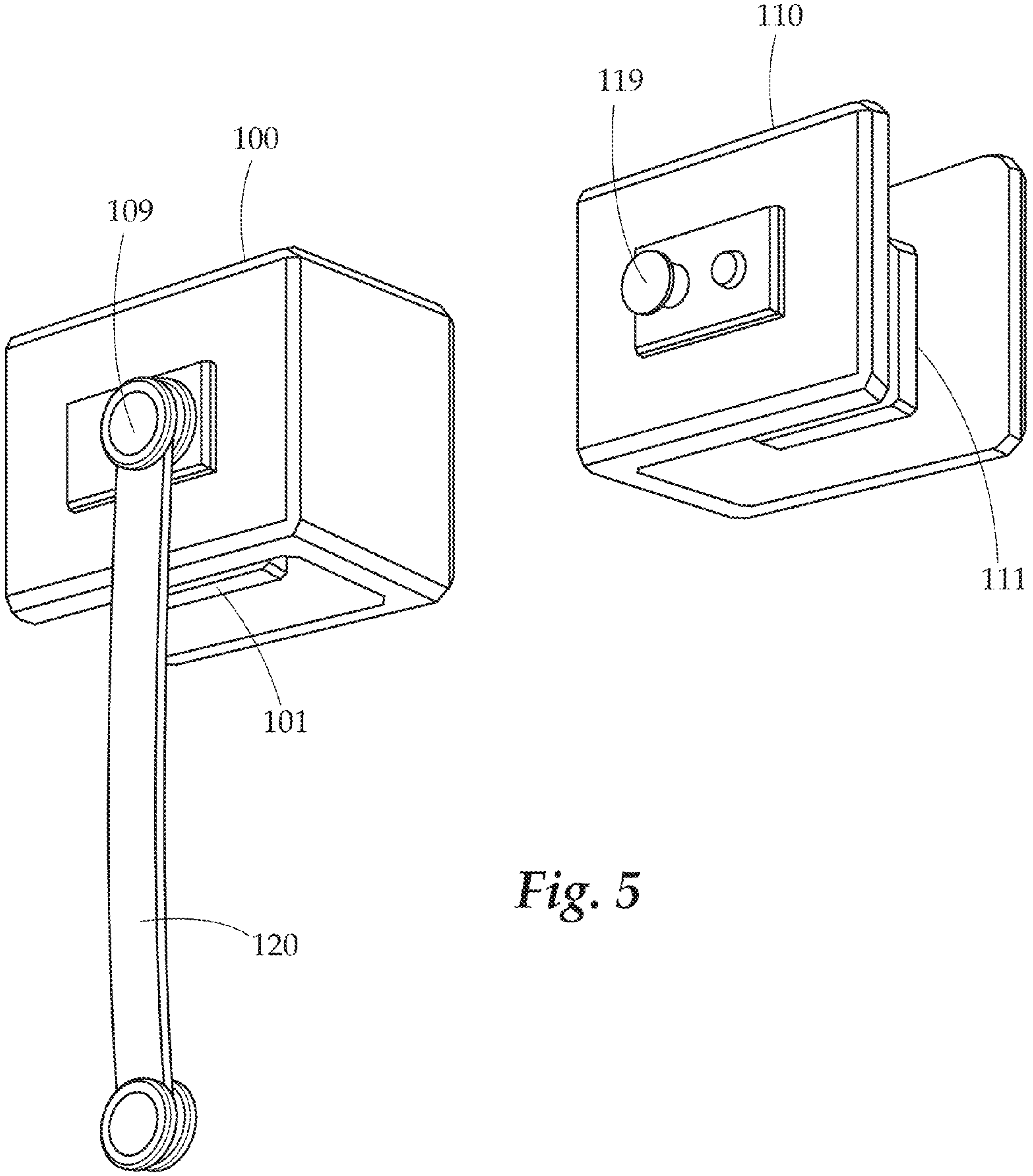
FIG. 5 is a structural diagram showing the friction-attached childproof latch for cabinets and drawers, according to a fourth exemplary embodiment of the present disclosure.

FIG. 4 and FIG. 5 show embodiments where the two pieces of the childproof latch are connected by mechanisms other than the hook/staple assembly. Since the structure of the shank 103 and the hook 104 may be rigid, in some embodiments, changing the shank and hook to a flexible material, such as a string or a piece of fabric, may be more suitable for drawer/cabinet configurations where the first panel and the second panel have varied distances in between.

FIG. 4 is a structural diagram showing a friction-attached childproof latch for cabinets and drawers, according to a third exemplary embodiment of the present disclosure.

In the exemplary embodiment shown in FIG. 4, the two pieces of the childproof latch are connected by a tether connector. As shown in FIG. 4, in this exemplary embodiment, instead of the hook/staple configuration, a couple of bases 106 and 116 are respectively placed on the side surfaces of the first and second frames 100 and 110, and the bases 106 and 116 may connect via a tether 107. In some embodiments, the couple of bases 106 and 116 may be screws. In some embodiments, the tether 107 may be removably connected to the bases 106 and 116, so that the latch can be opened or secured by detaching the tether from one of the bases or attaching the tether back to one of the bases. In some embodiments, the bases 106 and 116 may also be removably connected to the first and second frames 100 and 110. Alternatively, the latch can be opened or secured by detaching one of the bases from the frame or attaching the base back to the frame. Meanwhile, the tether may remain connected to the bases. This exemplary embodiment may be particularly suitable for a dual-door securing assembly, but may also be used for other configurations.

FIG. 5 is a structural diagram showing a friction-attached childproof latch for cabinets and drawers, according to a fourth exemplary embodiment of the present disclosure.

In the exemplary embodiment shown in FIG. 5, the two pieces of the childproof latch are connected by a snap fastener. Wherein, one end of a ribbon 120 may be connected to a side surface of the first frame 100, and the other end of the ribbon may have a stud 109 attached. A socket 119 matching the stud 109 may be attached to a corresponding side surface of the second frame 110. In this embodiment, the stud 109 may be snapped onto the socket 119 or detached from the socket, so that the latch could be opened or secured. This exemplary embodiment may also be particularly suitable for a dual-door securing assembly. In some embodiments, the ribbon 120 may also removably connect to the first frame 100 via a second stud and a second socket.

Figure 6:
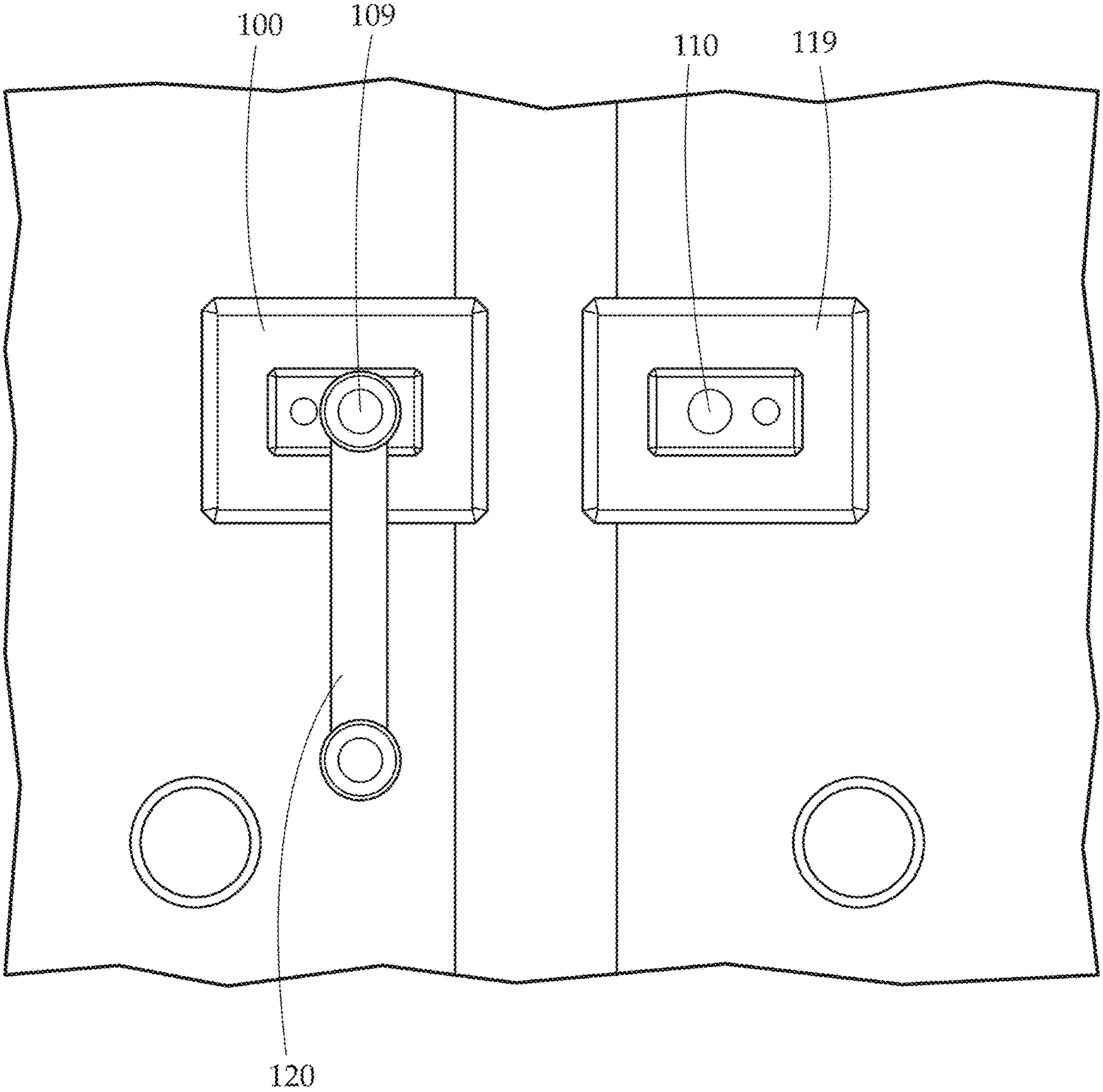
FIG. 6 is diagram showing the friction-attached childproof latch for cabinets and drawers in use, according to the fourth exemplary embodiment of the present disclosure.

FIG. 6 is diagram showing the friction-attached childproof latch for cabinets and drawers in use, according to the fourth exemplary embodiment of the present disclosure.

As shown in FIG. 6, a first and second halves of a childproof latch may be respectively secured to a left door of a dual-door cabinet and a right door of a dual-door cabinet. The first and second halves may be symmetrically placed about a horizontal plane dividing the two doors. A snap fastener as discussed above may be used to connect the two halves. When the snap fastener is secured, the childproof latch may hold the dual-door assembly closed until a user opens the latch. A user—but not a young child or a pet—may open the latch by separating the stud from the socket and may secure the latch by snapping the stud onto the socket.

Figure 7:
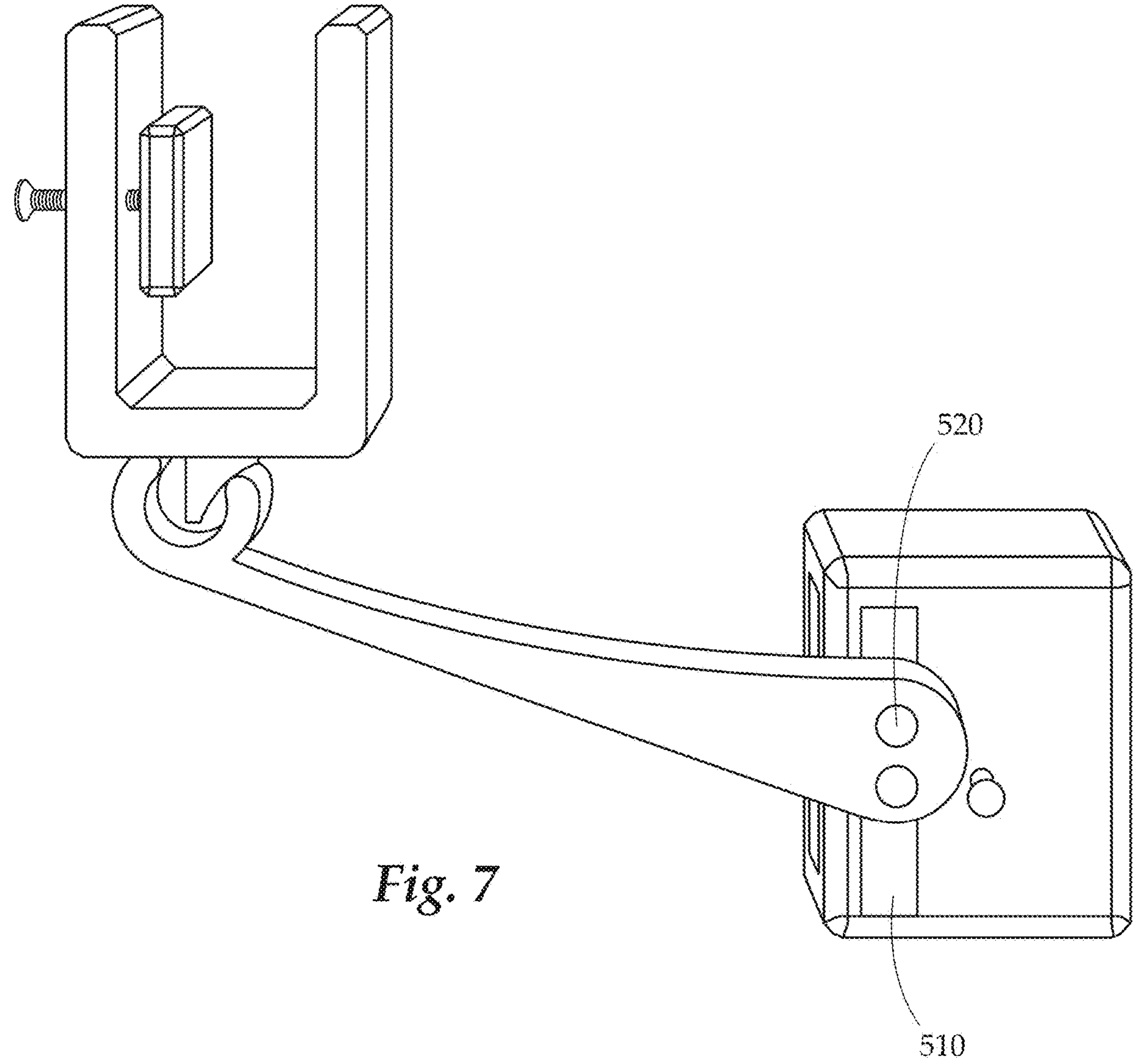
FIG. 7 is a structural diagram showing an additional distance/height adjustment mechanism of the friction-attached childproof latch for cabinets and drawers, according to some embodiments of the present disclosure.

FIG. 7 is a structural diagram showing an additional distance/height adjustment mechanism of the friction-attached childproof latch for cabinets and drawers, according to some embodiments of the present disclosure.

For some cabinet/drawer configurations, it can be hard to properly line up the two halves of a latch. Hence, an additional distance/height adjustment mechanism could be introduced to bridge any potential gap or height difference between the two panels that the user would like to connect with a childproof latch.

In some embodiments, the distance/height adjustment mechanism may be implemented as a slide/rail mechanism, as shown in FIG. 7. In FIG. 7, one of the surfaces of the frame 100 further includes a slide/rail configuration 510. In some embodiments, the slide/rail configuration 510 may contain one or more rails, and a slide that can move along the one or more rails. A latch component, which may be a shank/hook piece, a staple, or other components, may be attached to the slide with one or more screws 520. When the one or more screws are tightened, the slide may be secured to the one or more rails and no longer able to move. When the one or more screws are loosened, the slide may move along the one or more rails, so that the position of the latch component may be adjusted.

For example, if the first and the second panels are further apart, the latch component may slide up so that it may match the other corresponding component. If the first and the second panels have a smaller distance in between, the latch component may slide down instead.

Besides being used as a childproof/pet-proof latch, the presently disclosed technology may also be used for other purposes and in different environments, such as at public utilities, outside sheds, on temporary barricades for military uses, construction, and/or law enforcement, on space stations, as a replacement for a broken hinge or lock on a door, etc.

Furthermore, unless explicitly stated in the claims, the use of order, numbers, letters, or other names for processing elements and sequences are not intended to limit the order of the processes and methods of the present disclosure. While various examples have been discussed in the disclosure as currently considered useful embodiments of the invention, it should be understood that such details are provided for illustrative purposes only. The appended claims are not limited to the disclosed embodiments, and instead, the claims are intended to cover all modifications and equivalent combinations within the scope and essence of the embodiments disclosed in the present disclosure. For example, although the described system components may be implemented through a hardware device, they may also be realized solely through a software solution, such as installing the described system on an existing processing or mobile device.

Similarly, it should be noted that, for the sake of simplifying the presentation of embodiments disclosed in the present disclosure and aiding in understanding one or more embodiments of the present disclosure, various features have been sometimes combined into a single embodiment, drawing, or description. However, this manner of disclosure does not imply that the features required by the claims are more than the features mentioned in the claims. In fact, the features of the embodiments are less than all the features of the single embodiment disclosed in the foregoing disclosure.

In some embodiments, numeric values describing the composition and quantity of attributes are used in the description. It should be understood that such numeric values used for describing embodiments may be modified with qualifying terms such as “about,” “approximately” or “generally”. Unless otherwise stated, “about,” “approximately” or “generally” indicates that a variation of ±20% is permitted in the described numbers. Accordingly, in some embodiments, the numerical parameters used in the disclosure and claims are approximations, which can change depending on the desired characteristics of the individual embodiment. In some embodiments, the numerical parameters should take into account a specified number of valid digits and employ a general manner of bit retention. Although the numerical ranges and parameters used in some embodiments of the present disclosure to confirm the breadth of the range are approximations, in specific embodiments, such numerical values are set as precisely as practicable.

With respect to each of the patents, patent applications, publications of patent applications, and other material, such as articles, books, specifications, publications, documents and the like, cited in the present disclosure, the entire contents thereof are hereby incorporated herein by reference. Application history documents that are inconsistent with the contents of the present disclosure or that create conflicts are excluded, as are documents (currently or hereafter appended to the present disclosure) that limit the broadest scope of the claims of the present disclosure. It should be noted that in the event of any inconsistency or conflict between the descriptions, definitions, and/or use of terminology in the materials appended to the present disclosure and the contents described herein, the descriptions, definitions, and/or use of terminology in the present disclosure shall prevail.

In closing, it should be understood that the embodiments described in the present disclosure are used only to illustrate the principles of the embodiments of the present disclosure. Other deformations may also fall within the scope of the present disclosure. Therefore, by way of example and not limitation, alternative configurations of the embodiments disclosed in the present disclosure may be considered consistent with the teachings of the present disclosure. Accordingly, the embodiments described in the present disclosure are not limited to the explicitly introduced and described embodiments in the present disclosure.

What is claimed is:

1. A friction-attached childproof latch, comprising:

a first half, including:

a first frame with one first top surface and two first side surfaces forming a first “C” shape;

a first jaw placed between the two first side surfaces, and connected to one of the first side surfaces via a first screw;

wherein, the first jaw is able to move along the first screw, by loosening or tightening the first screw;

a first connector connected to the first frame;

a second half, including:

a second frame with one second top surface and two second side surfaces forming a second "C" shape;

a second jaw placed between the two second side surfaces, and connected to one of the second side surfaces via a second screw;

wherein, the second jaw is able to move along the second screw, by loosening or tightening the second screw;

a second connector connected to the second frame;

wherein, the first connector is configured to be removably connected to the second connector.

2. The friction-attached childproof latch in claim 1, wherein the first connector is connected to the first frame via a first extension piece;

wherein, the first extension piece is a plate co-planarly or substantially co-planarly arranged with the first top surface or one of the two first side-surfaces.

3. The friction-attached childproof latch in claim 1, wherein the first connector is an elongated shank with a hook and the second connector is a staple, and the first connector and the second connector are configured to be detachably connected by attaching the hook to the staple.

4. The friction-attached childproof latch in claim 1, wherein the first connector includes a first base on the first frame and a tether connected to the first base, the second connector includes a second base;

wherein the tether is configured to be removably connected to the second base.

5. The friction-attached childproof latch in claim 1, wherein the first connector includes a ribbon with one end attached to the first frame and the other end attached to a stud, and the second connector includes a socket attached to the second frame;

wherein the first connector and the second connector is configured to be connected or separated by snapping the stud onto the socket or detaching the stud from the socket.

6. The friction-attached childproof latch in claim 1, wherein the first frame further includes one or more rails and a slide able to move along the one or more rails;

wherein the first connector is connected to the slide via one or more third screws;

wherein when the one or more third screws are tightened, the slide is able to be secured to the one or more rails and no longer able to move with regard to the one or more rails.

7. The friction-attached childproof latch in claim 1, wherein the one first top surface and the two first side surfaces are all rectangular and flat.

8. The friction-attached childproof latch in claim 1, wherein the two first side surfaces are identical.

9. A half of a friction-attached childproof latch, comprising:

a frame with one top surface and two side surfaces forming a "C" shape;

a jaw placed between the two side surfaces, and connected to one of the side surfaces via a first screw;

wherein, the jaw is able to move along the first screw, by loosening or tightening the first screw;

a connector connected to the frame, able to be removably connected to a second connector of a second half of the friction-attached childproof latch;

wherein, the second half includes a second frame with one second top surface and two second side surfaces, forming a second "C" shape.

10. The half of a friction-attached childproof latch in claim 9, wherein the connector is connected to the frame via an extension piece;

wherein, the first extension piece is a plate co-planarly or substantially co-planarly arranged with the first top surface or one of the two first side-surfaces.

11. The half of a friction-attached childproof latch in claim 9, wherein the connector is an elongated shank with a hook.

12. The half of a friction-attached childproof latch in claim 9, wherein the connector is a staple.

13. The half of a friction-attached childproof latch in claim 9, wherein the connector includes a first base on the first frame and a tether connected to the first base.

14. The half of a friction-attached childproof latch in claim 9, wherein the connector includes a second base able to be removably connected to a tether.

15. The half of a friction-attached childproof latch in claim 9, wherein the connector includes a ribbon with one end attached to the first frame and the other end attached to a stud, able to be snapped onto and detached from a socket.

16. The half of a friction-attached childproof latch in claim 9, wherein the connector includes a socket able to be removably connected to a stud.

17. The half of a friction-attached childproof latch in claim 9, wherein the frame further includes one or more rails and a slide able to move along the one or more rails;

wherein the connector is connected to the slide via one or more third screws;

wherein in response to that the one or more third screws are tightened, the slide is secured to the one or more rails and no longer able to move with regard to the one or more rails.

18. The half of a friction-attached childproof latch in claim 9, wherein the one top surface and the two side surfaces are all rectangular and flat, and form a rectangular cuboid.

19. The friction-attached childproof latch of claim 1, comprising:

wherein the first connector is an elongated shank with a hook connected to one of the two first side surfaces, or connected to an extension piece connected to and co-planarly arranged with the one of the two first side surfaces;

wherein, the first frame is configured to be secured onto an upper edge of a drawer front of a lower drawer;

wherein the second connector is a staple connected to the second top surface, or an extension piece connected to and co-planarly arranged with the second top surface;

wherein, the second frame is configured to be secured onto a lower edge of a drawer front of an upper drawer.

20. The half of a friction-attached childproof latch in claim 9, wherein a panel of a drawer or cabinet is removably friction-attached between the jaw and the frame.

* * * * *